US 6,683,655 B2

(12) United States Patent
Han

(10) Patent No.: US 6,683,655 B2
(45) Date of Patent: Jan. 27, 2004

(54) VIDEO FORMAT CONVERTING APPARATUS

(75) Inventor: Dong Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 401 days.

(21) Appl. No.: 09/758,362

(22) Filed: Jan. 12, 2001

(65) Prior Publication Data

US 2001/0007477 A1 Jul. 12, 2001

(30) Foreign Application Priority Data

Jan. 12, 2000 (KR) .......................................... 2000-1420

(51) Int. Cl.$^7$ .............................. H04N 9/74; H04N 7/01

(52) U.S. Cl. ...................... 348/581; 348/458; 348/558; 348/555; 348/441

(58) Field of Search ................................. 348/441, 458, 348/581, 554, 555, 558, 705, 706; 382/298, 299, 300; 345/600, 601, 602, 603, 606; H04N 9/74, 7/01, 11/20

(56) References Cited

U.S. PATENT DOCUMENTS 6,097,437 A * 8/2000 Hwang ........................ 348/441
6,130,721 A * 10/2000 Yoo et al. .................... 348/558
6,333,762 B1 * 12/2001 Yoo et al. .................... 348/441

* cited by examiner

Primary Examiner—Sherrie Hsia
(74) Attorney, Agent, or Firm—Birch, Stewart, Kolasch & Birch, LLP

(57) ABSTRACT

A video format converting apparatus which optionally converts the sizes of input and output videos includes a mode generator for generating a control signal of required data flow and a clock required for format conversion by determining a format conversion structure after receiving format data of input and output videos, a format converter of which input/output data path is controlled to a corresponding operation mode by the control signal, for independently format converting the input video synchronized with the clock in vertical and horizontal directions, and a plurality of multiplexers for providing proper video to the format converter in accordance with the signal of the mode generator. When various kinds of input videos are format converted to various kinds of output videos, it is possible to reduce the capacity of required hardware and the capacity of the memory. Thus, a minimum memory band width is required.

21 Claims, 5 Drawing Sheets mode A mode B mode C mode D

VIDEO FORMAT CONVERTING APPARATUS

BACKGROUND OF THE INVENTION

1. Field of the Invention

The present invention relates to a digital TV, and more particularly to a video format converting apparatus which converts a format of an input video.

2. Description of the Related Art

With introduction of a digital TV and development of various display devices, they provide more various kinds of videos than an existing analog TV. To convert various sizes of input videos to different sizes of output videos, a format converter is essentially required.

FIG. 1 is a block diagram showing a related art video format converting apparatus. If a format conversion of an input video is required, a first format converter 11 is used for decreasing the size of the input video while a second format converter 13 is used for increasing the size of the input video. At this time, both the first format converter 11 and the second format converter 13 include horizontal and vertical format converters. A memory 12 is arranged between the first and second format converters 11 and 13, and stores the decreased input video or original input video and then outputs the stored input video to the second format converter 13.

In the aforementioned related art video format converting apparatus, the first format converter 11 is located at the front end of the memory 12 while the second format converter 13 is located at the rear end of the memory 12. In this case, the format conversion can effectively be performed with decreasing the capacity of the memory. However, to this end, two format converters are required. This could lead to increase of hardware.

SUMMARY OF THE INVENTION

Accordingly, the present invention is directed to a video format converting apparatus that substantially obviates one or more of the problems due to limitations and disadvantages of the related art.

An object of the present invention is to provide a video format converting apparatus which optionally converts the sizes of input and output videos.

Another object of the present invention is to provide a video format converting apparatus that decreases and increases the size of a video using one format converter, thereby minimizing the capacity of a memory and hardware.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a video format converting apparatus according to the present invention includes a mode generator for generating a control signal of required data flow and a clock required for format conversion by determining a format conversion structure after receiving format data of input and output videos, a format converter of which input/output data path is controlled to a corresponding operation mode by the control signal, for independently format converting the input video synchronized with the clock in vertical and horizontal directions, and a plurality of multiplexers for providing proper video to the format converter in accordance with the signal of the mode generator.

The mode generator outputs a display clock synchronized with the output video if increase of the input video is required, and outputs an input clock synchronized with the input video if decrease of the input video is required.

The format converter includes a vertical format converter for vertically increasing or decreasing the input video, a horizontal format converter for horizontally increasing or decreasing the input video, and a memory for storing either the input video or the video vertically or horizontally decreased in accordance with the operation mode determined by the mode generator and outputting the stored video to a display device without further processing or outputting the stored video to the display device after format converting it through the vertical format converter or the horizontal format converter.

If it is determined by the mode generator that increase of the input video is required in vertical and horizontal directions, the input video is stored in the memory under the control of the mode generator and input to the vertical format converter to increase the number of vertical lines. The video having the increased number of the vertical lines is input to the horizontal format converter to increase the number of horizontal pixels and then output to the display device.

If it is determined by the mode generator that decrease of the input video is required in vertical and horizontal directions, the input video is input to the horizontal format converter under the control of the mode generator to decrease the number of the horizontal pixels. The video having the decreased number of the horizontal pixels is input to the vertical format converter to decrease the number of the vertical lines, and the video decreased in vertical and horizontal directions is stored in the memory and then output to the display device.

If it is determined by the mode generator that decrease of the input video is required in vertical direction and increase of the input video is required in horizontal direction, the input video is input to the vertical format converter under the control of the mode generator to decrease the number of the vertical lines, and the video having the decreased number of the vertical lines is stored in the memory, is input to the horizontal format converter to increase the number of horizontal pixels, and is finally output to the display device.

If it is determined by the mode generator that increase of the input video is required in vertical direction and decrease of the input video is required in horizontal direction, the input video is input to the horizontal format converter under the control of the mode generator to decrease the number of the horizontal pixels, and the video having the decreased number of the horizontal pixels is stored in the memory, is input to the vertical format converter to increase the number of the vertical lines, and is finally output to the display device.

If it is determined by the mode generator that the size of the input video is equal to the size of the output video, the input video is stored in the memory under the control of the mode generator and then output to the display device.

In the preferred embodiment of the present invention, in format converting various sizes of the input videos to adapt to the various kinds of the display devices, a structure of the format converting apparatus is automatically varied in accordance with the sizes of the input and output videos, and a proper operational clock is selectively used to decrease the capacity of required hardware.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
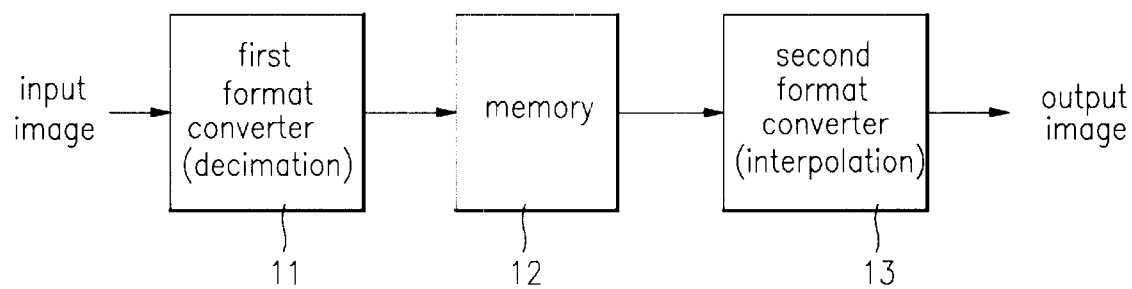
FIG. 1 is a block diagram showing a related art video format converting apparatus.
Figure 2:
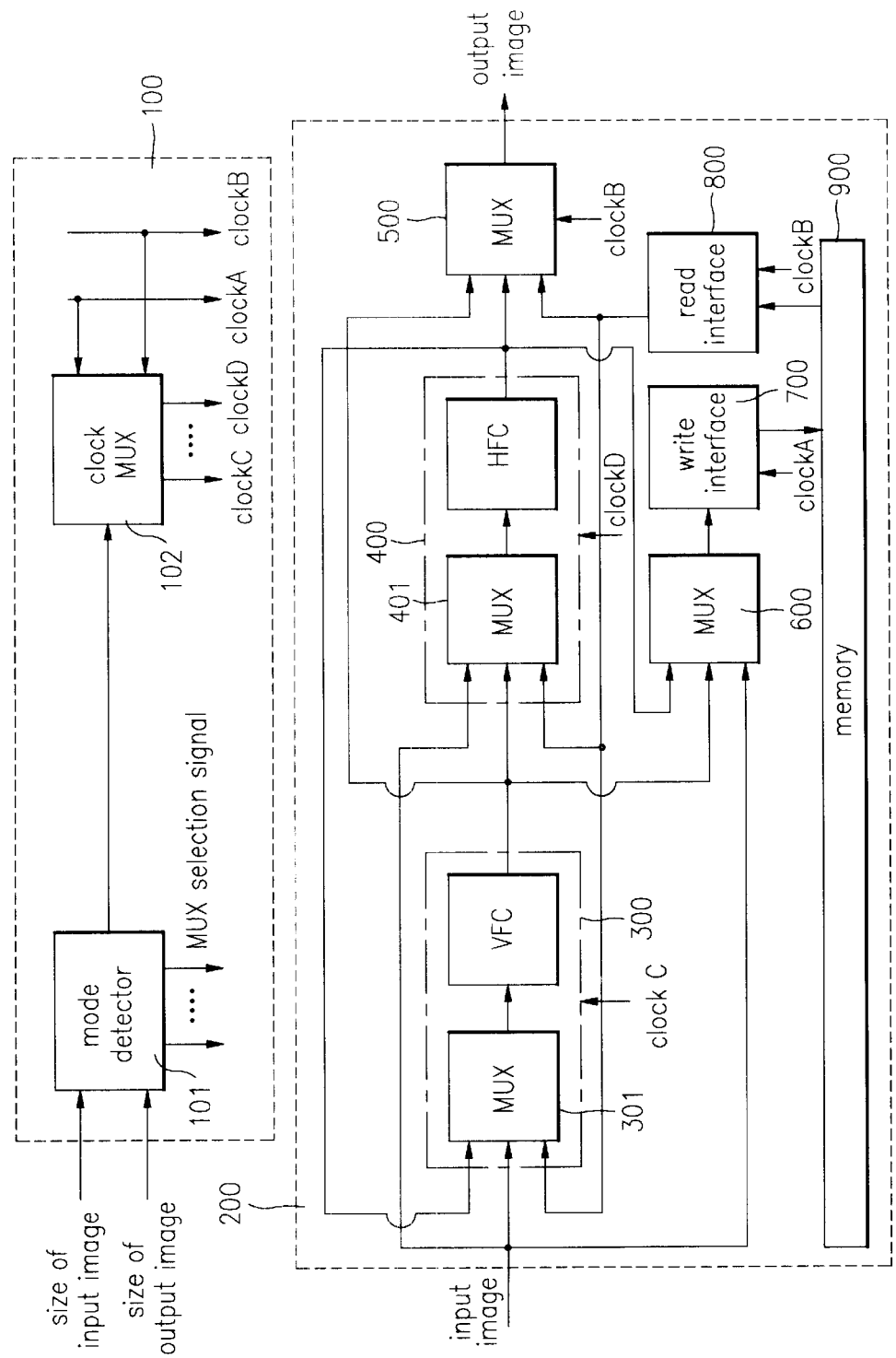
FIG. 2 is a block diagram showing a video format converting apparatus according to the present invention.

FIG. 2 is a block diagram showing a video format converting apparatus according to the present invention. Referring to FIG. 2, the video format converting apparatus according to the present invention includes a mode generator 100 and a format converter 200.

The mode generator 100 includes a mode detector 101 and a clock multiplexer (MUX) 102. The format converter 200 includes a vertical format converter 300, a horizontal format converter 400, a memory write interface 700, a memory read interface 800, a memory 900, and a plurality of multiplexers (MUX) 500 and 600. The vertical format converter 300 and the horizontal format converter 400 are respectively provided with multiplexers (MUX) 301 and 401.

The multiplexer 301 is a selector for selectively outputting one of the input video, the output video of the horizontal format converter 400, and the output video of the memory 900 under the control of the mode generator 100. The multiplexer 401 is a selector for selectively outputting one of the input video, the output video of the vertical format converter 300, and the output vide of the memory 900 under the control of the mode generator 100.

In other words, the multiplexer 301 selects the output video of the memory 900 under the control of the mode generator if it is determined that increase of the video is required in vertical and horizontal directions, or increase of the video is required in vertical direction and decrease of the video is required in horizontal direction, selects the video output from the horizontal format converter 400 if it is determined that decrease of the video is required in vertical and horizontal directions, and selects the input video if it is determined that decrease of the video is required in vertical direction and increase of the video is required in horizontal direction. The multiplexer 301 outputs the selected video to the vertical format converter at the rear end.

The multiplexer 401 selects the output video of the vertical format converter 300 under the control of the mode generator 100 if it is determined that increase of the video is required in vertical and horizontal directions, selects the input video if it is determined that decrease of the video is required in vertical and horizontal directions, or increase of the video is required in vertical direction and decrease of the video is required in horizontal direction, and selects the output video of the memory 900 if it is determined that decrease of the video is required in vertical direction and increase of the video is required in horizontal direction. The multiplexer 401 outputs the selected video to the horizontal format converter at the rear end.

The mode detector 101 of the mode generator 100 determines an operational mode of the format converter 200 by receiving the size of an input video and the size of an output video, and outputs a selection signal to the respective multiplexers 301, 401, 500 and 600 in accordance with the determined operational mode. The mode detector 101 also outputs a control signal to a clock multiplexer 102 in accordance with the determined operational mode to select a clock provided to the vertical format converter 300 and the horizontal format converter 400.

The clock multiplexer 102 of the mode generator 100 provides a required clock to the vertical format converter 300 and the horizontal format converter 400 in accordance with the control signal of the mode detector 101.

The format converter 200 generally requires four kinds of clocks.

Proper format conversion and display processing are performed using two clocks A and B input to the clock multiplexer 102, and two clocks C and D for format conversion, selectively output from the clock multiplexer 102. It is assumed that the clock A is an input clock and the clock B is a display clock. The clocks C and D may be input clocks or display clocks in accordance with the operational mode. In this case, the input clock is synchronized with the input video while the display clock is synchronized with the output video. The frequency of the input clock and the frequency of the display clock are varied in accordance with the size of the input video and the size of the output video.

As described above, the two clocks C and D applied to the format converter 200 are varied in accordance with the sizes of the input and output videos, and clocks as shown in Table 1 below are output.

TABLE 1

Clock selection according to conversion ratio

| vertical format conversion ratio | horizontal format conversion ratio | clock for vertical format conversion (clock C) | clock for horizontal format conversion (clock D) |
|---|---|---|---|
| increase or as it is | increase or as it is | display clock (clock B) | display clock (clock B) |
| decrease | decrease | input clock (clock A) | input clock (clock A) |
| decrease | increase or as it is | input clock (clock A) | display clock (clock B) |
| increase or as it is | decrease | display clock (clock B) | input clock (clock A) |

In other words, if the input video is output either by increase or as it is, the display clock is required during format conversion. If the input video is output by decrease, the input clock is required during format conversion. This is equally applied to vertical format conversion and horizontal format conversion.

The format converter 200 is operated by an input operational mode signal in total five modes as shown in FIGS. 3a to 3e.

In other words, for normal format conversion, the format converter 200 is operated in four modes as shown in FIGS.

Figure 3A:
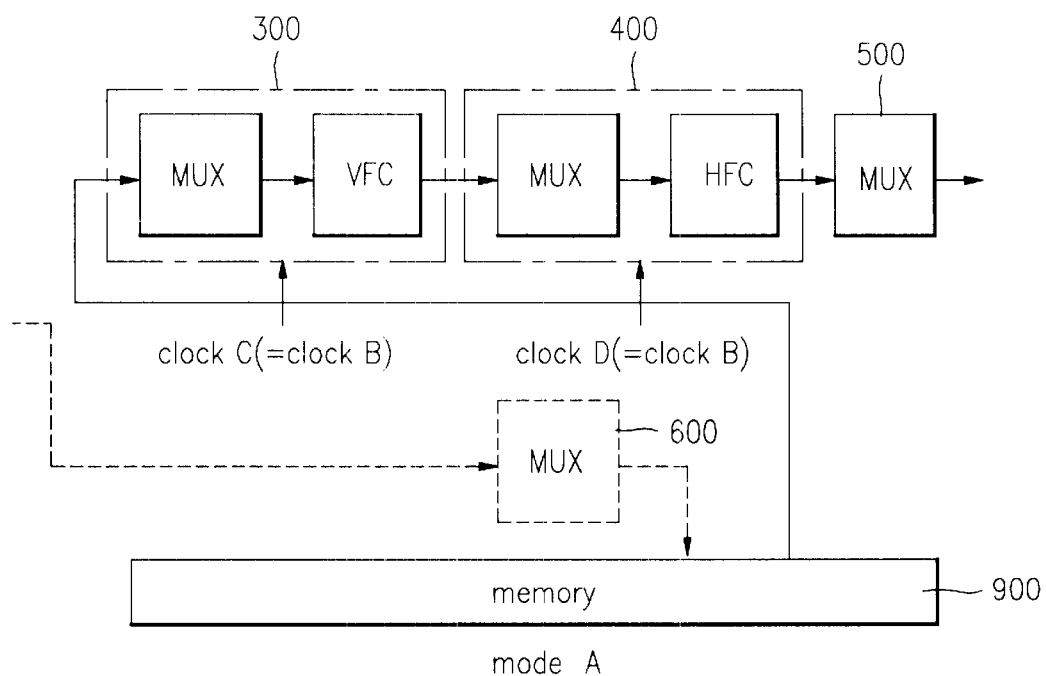
FIG. 3 shows examples of respective operational modes of a video format converting apparatus according to the present invention.

3a to 3d. If the size of the input video is equal to the size of the output video, the format converter 200 can be operated in a mode as shown in FIG. 3a or FIG. 3e. Also, in case of conversion of various modes as shown in FIGS. 3a to 3d, the mode of the format converter 200 is converted to other mode after passing through the mode of FIG. 3e, so as to perform stable operation.

At this time, the mode conversion of the format converter 200 is performed in such a manner that a plurality of multiplexers located within the format converter 200 are controlled by the selection signal of the mode detector 101.

For example, if the size of the output video is equal to or greater than the size of the input video, the format converter 200 is operated in a mode A of FIG. 3a. That is, in the mode A, the input video is stored in the memory 900 through the multiplexer 600 and the write interface 700. Then, the vertical format converter 300 increases the number of the vertical lines while the horizontal format converter 400 increases the number of the horizontal pixels. The finally processed video is output to the display device through the multiplexer 500. At this time, the clocks C and D provided to the vertical format converter 300 and the horizontal format converter 400 through the clock multiplexer 102 are display clocks B.

Figure 3B:
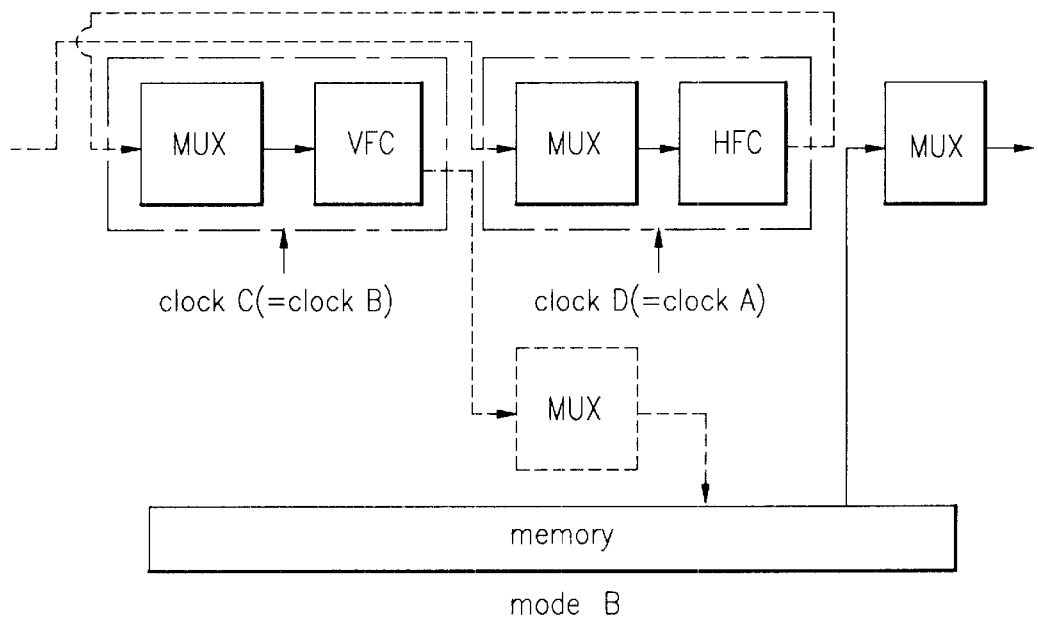

Furthermore, if the size of the output video is smaller than the size of the input video in horizontal and vertical directions, the format converter 200 is operated in a mode B of FIG. 3b. That is, the input video is stored in the memory 900 through the multiplexer 600 and the write interface 700 after the number of the horizontal pixels are decreased through the horizontal format converter 400 and the number of the vertical lines are decreased through the vertical format converter 300. Then, the decreased video stored in the memory 900 is output to the display device through the memory read interface 800 and the multiplexer 500. At this time, the clocks C and D provided to the vertical format converter 300 and the horizontal format converter 400 through the clock multiplexer 102 are input clocks A.

Figure 3C:
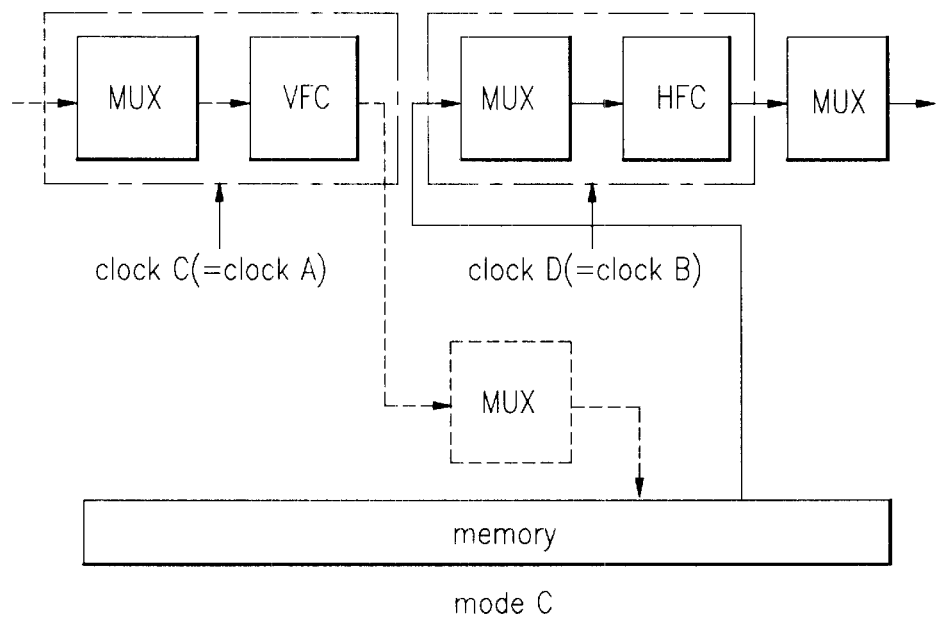

If the size of the output video decreases vertically and increases horizontally, the format converter 200 is operated in a mode C of FIG. 3c. That is, the input video is stored in the memory 900 through the multiplexer 600 and the write interface 700 after the number of the vertical lines are decreased through the vertical format converter 300. Then, the video stored in the memory 900 is output to the horizontal format converter 400 through the read interface 800. The horizontal format converter 400 increases the number of the horizontal pixels of the input video and then output the finally processed video to the display device through the multiplexer 500. At this time, the clock C provided to the vertical format converter 300 through the clock multiplexer 102 is the input clock A, and the clock D provided to the horizontal format converter 400 is the display clock B.

Figure 3D:
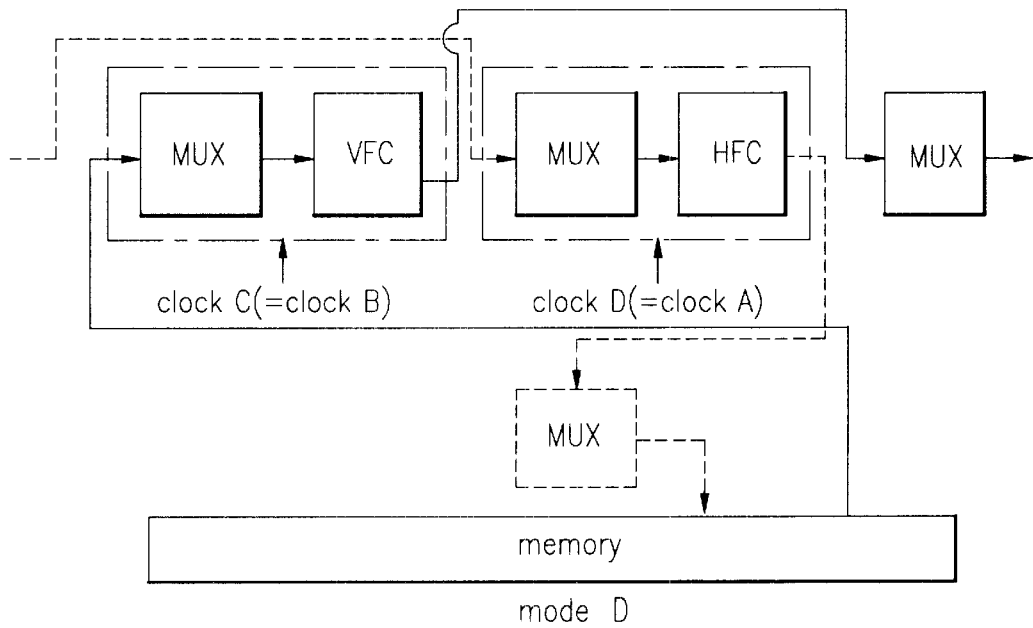
Figure 3E:
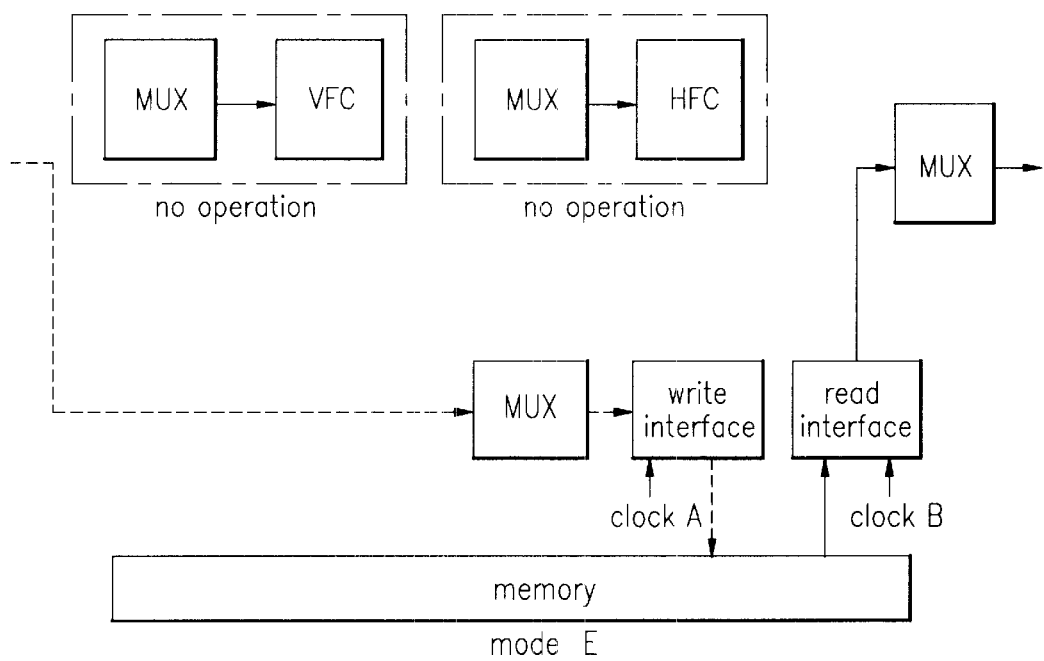

If the size of the output video decreases horizontally and increases vertically, the format converter 200 is operated in a mode D of FIG. 3d. That is, the input video is stored in the memory 900 through the multiplexer 600 and the write interface 700 after the number of the horizontal pixels are decreased through the horizontal format converter 400. Then, the video stored in the memory 900 is output to the vertical format converter 300 through the read interface 800. The vertical format converter 300 increases the number of the vertical lines of the input video and then output the finally processed video to the display device through the multiplexer 500. At this time, the clock C provided to the vertical format converter 300 through the clock multiplexer 102 is the display clock B, and the clock D provided to the horizontal format converter 400 is the input clock A.

The above operation is performed in such a manner that a required clock is provided to each format converter 200 and a path of video data is controlled by the multiplexer.

Meanwhile, when one operational mode is changed to other operational mode, the clock applied to the horizontal format converter 400 and the vertical format converter 300 is varied on one or two frame periods. In this case, abnormal operation may be performed. To avoid abnormal operation, the mode E may be performed as shown in FIG. 3e.

Also, in even case that the size of the input video is equal to the size of the output video, the mode E may be performed as shown in FIG. 3e. That is, in the mode E, the input video is stored in the memory 900 through the multiplexer 600 and the write interface 700 and the output through the read interface 800 and the multiplexer 500. At this time, the vertical format converter 300 and the horizontal format converter 400 are not operated.

As described above, in the present invention, a structure of the format converting apparatus is properly varied in accordance with the sizes of the input and output videos. It is possible to reduce the capacity of the memory and hardware by properly controlling the clock required for format conversion. To this end, it is important that the clock is properly distributed. Particularly, when converting the mode, a separate mode (mode E) is provided. The mode E enables stable operation in various modes and in even case of mode conversion.

As aforementioned, the video format converting apparatus according to the present invention has the following advantages.

When various kinds of input videos are format converted to various kinds of output videos, it is possible to reduce the capacity of required hardware and the capacity of the memory. Thus, a minimum memory band width is required.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A video format converting apparatus comprising:
  a mode generator for determining a format conversion operational mode after receiving format data of input and output videos, and generating a control signal and a clock required for vertical/horizontal format conversion in the determined operational mode, wherein the mode generator outputs a display clock synchronized with the output video if increase of the input video is required, and outputs an input clock synchronized with the input video if decrease of the input video is required; and
  a format converter of which input/output data path is controlled by the control signal in the determined operational mode, for synchronizing a video input through the selected input/output data path with the clock, and format converting the video in vertical and horizontal directions.

2. The video format converting apparatus of claim 1, wherein the format converter includes a vertical format converter for vertically increasing or decreasing the input video, a horizontal format converter for horizontally increasing or decreasing the input video, and a memory for storing either the input video or the video vertically or horizontally decreased in accordance with the operational mode determined by the mode generator and outputting the stored video to a display device without further processing or outputting the stored video to the display device after format converting it through the vertical format converter or the horizontal format converter.

3. The video format converting apparatus of claim 2, wherein the vertical format converter includes:
   a selector for selectively outputting one of the input video, the output video of the horizontal format converter, and the output video of the memory under the control of the mode generator; and
   a vertical format converter for increasing or decreasing the number of vertical lines of the video output from the selector.

4. The video format converting apparatus of claim 3, wherein the selector selects the video output from the memory under the control of the mode generator if it is determined that increase of the video is required in vertical and horizontal directions, or increase of the video is required in vertical direction and decrease of the video is required in horizontal direction, selects the video output from the horizontal format converter if it is determined that decrease of the video is required in vertical and horizontal directions, and selects the input video if it is determined that decrease of the video is required in vertical direction and increase of the video is required in horizontal direction.

5. The video format converting apparatus of claim 2, wherein the mode generator outputs a display clock synchronized with the output video to the vertical format converter if it is determined that increase of the input video is required in vertical direction, and outputs an input clock synchronized with the input video to the vertical format converter if it is determined that decrease of the input video is required in vertical direction.

6. The video format converting apparatus of claim 2, wherein the horizontal format converter includes:
   a selector for selectively outputting one of the input video, the output video of the vertical format converter, and the output video of the memory under the control of the mode generator; and
   a horizontal format converter for increasing or decreasing the number of horizontal pixels of the video output from the selector.

7. The video format converting apparatus of claim 6, wherein the selector selects the output video of the vertical format converter under the control of the mode generator if it is determined that increase of the video is required in vertical and horizontal directions, selects the input video if it is determined that decrease of the video is required in vertical and horizontal directions, or increase of the video is required in vertical direction and decrease of the video is required in horizontal direction, and selects the output video of the memory if it is determined that decrease of the video is required in vertical direction and increase of the video is required in horizontal direction.

8. The video format converting apparatus of claim 2, wherein the mode generator outputs the display clock synchronized with the output video to the horizontal format converter if it is determined that increase of the input video is required in horizontal direction, and outputs the input clock synchronized with the input video to the horizontal format converter if it is determined that decrease of the input video is required in horizontal direction.

9. The video format converting apparatus of claim 2, wherein if it is determined by the mode generator that increase of the input video is required in vertical and horizontal directions, the input video is stored in the memory of the format converter under the control of the mode generator and input to the vertical format converter to increase the number of vertical lines, the video having the increased number of the vertical lines being input to the horizontal format converter to increase the number of horizontal pixels and then output to the display device.

10. The video format converting apparatus of claim 2, wherein if it is determined by the mode generator that decrease of the input video is required in vertical and horizontal directions, the input video is input to the horizontal format converter under the control of the mode generator to decrease the number of the horizontal pixels, the video having the decreased number of the horizontal pixels being input to the vertical format converter to decrease the number of the vertical lines, and the video decreased in vertical and horizontal directions being stored in the memory and then output to the display device.

11. The video format converting apparatus of claim 2, wherein if it is determined by the mode generator that decrease of the input video is required in vertical direction and increase of the input video is required in horizontal direction, the input video is input to the vertical format converter under the control of the mode generator to decrease the number of the vertical lines, the video having the decreased number of the vertical lines being stored in the memory, being input to the horizontal format converter to increase the number of horizontal pixels, and being finally output to the display device.

12. The video format converting apparatus of claim 2, wherein if it is determined by the mode generator that increase of the input video is required in vertical direction and decrease of the input video is required in horizontal direction, the input video is input to the horizontal format converter under the control of the mode generator to decrease the number of the horizontal pixels, the video having the decreased number of the horizontal pixels being stored in the memory, being input to the vertical format converter to increase the number of the vertical lines, and being finally output to the display device.

13. The video format converting apparatus of claim 2, wherein if it is determined by the mode generator that the size of the input video is equal to the size of the output video, the input video is stored in the memory under the control of the mode generator and then output to the display device.

14. The video format converting apparatus of claim 2, wherein if it is determined by the mode generator that one operational mode is changed to other operational mode, the input video is operated in a corresponding changed mode after being stored in the memory under the control of the mode generator and then output to the display device.

15. The video format converting apparatus of claim 2, wherein the format converter further includes a selector for selectively outputting one of output videos from the vertical format converter, the horizontal format converter, and the memory under the control signal according to the operational mode determined by the mode generator.

16. The video format converting apparatus of claim 2, wherein the format converter further includes a selector for selectively outputting one of the input video, the output videos from the vertical and horizontal format converters under the control signal according to the operational mode determined by the mode generator.

17. A video format converting apparatus comprising:

a mode generator for determining a format conversion operational mode after receiving format data of input and output videos, and generating a control signal and a clock required for vertical/horizontal format conversion in the determined operational mode; and a format converter of which input/output data path is controlled by the control signal in the determined operational mode, for synchronizing a video input through the selected input/output data path with the clock, and format converting the video in vertical and horizontal directions wherein the format converter includes a vertical format converter for vertically increasing or decreasing the input video, a horizontal format converter for horizontally increasing or decreasing the input video, and a memory for storing either the input video or the video vertically or horizontally decreased in accordance with the operational mode determined by the mode generator and outputting the stored video to a display device without further processing or outputting the stored video to the display device after format converting it through the vertical format converter or the horizontal format converter.

18. The video format converting apparatus of claim 17, wherein the vertical format converter includes:

a selector for selectively outputting one of the input video, the output video of the horizontal format converter, and the output video of the memory under the control of the mode generator; and a vertical format converter for increasing or decreasing the number of vertical lines of the video output from the selector.

19. The video format converting apparatus of claim 17, wherein the horizontal format converter includes:

a selector for selectively outputting one of the input video, the output video of the vertical format converter, and the output video of the memory under the control of the mode generator; and a horizontal format converter for increasing or decreasing the number of horizontal pixels of the video output from the selector.

20. The video format converting apparatus of claim 17, wherein the format converter further includes a selector for selectively outputting one of output videos from the vertical format converter, the horizontal format converter, and the memory under the control signal according to the operational mode determined by the mode generator.

21. The video format converting apparatus of claim 17, wherein the format converter further includes a selector for selectively outputting one of the input video, the output videos from the vertical and horizontal format converters under the control signal according to the operational mode determined by the mode generator.

* * * * *